United States Patent [19]

Muto et al.

[11] Patent Number: 5,668,453
[45] Date of Patent: Sep. 16, 1997

[54] METHOD OF CALCULATING POINTS AND NORMAL LINES OF CONTACT AND APPARATUS THEREFOR

[75] Inventors: Shinyo Muto; Ken-ichiro Shimokura, both of Tokyo, Japan

[73] Assignee: Nippon Telegraph and Telephone Corporation, Tokyo, Japan

[21] Appl. No.: 683,860

[22] Filed: Jul. 19, 1996

Related U.S. Application Data

[63] Continuation of Ser. No. 335,974, Nov. 4, 1994, abandoned.

[30] Foreign Application Priority Data

| Nov. 5, 1993 | [JP] | Japan | 5-277187 |
| Nov. 11, 1993 | [JP] | Japan | 5-282693 |

[51] Int. Cl.$^6$ ............................................. B25J 9/06
[52] U.S. Cl. ........................ 318/568.17; 318/568.18; 364/474.06; 364/474.28; 395/97
[58] Field of Search ........................ 318/566–574; 364/167.01, 474.03, 474.06, 474.28–474.36; 395/95, 96, 97

[56] References Cited

U.S. PATENT DOCUMENTS

| 4,808,063 | 2/1989 | Haley ........................... 318/567 |
| 4,952,772 | 8/1990 | Zana ........................... 318/577 X |
| 5,067,085 | 11/1991 | Wenzel et al. ........................... 364/474.06 |
| 5,261,768 | 11/1993 | Loucks et al. ........................... 364/474.03 X |
| 5,343,385 | 8/1994 | Joskowicz et al. ........................... 364/167.01 |
| 5,399,951 | 3/1995 | LaVallee et al. ........................... 318/567 |

*Primary Examiner*—Brian Sircus
*Attorney, Agent, or Firm*—Finnegan, Henderson, Farabow, Garrett & Dunner, L.L.P.

[57] ABSTRACT

The presentation of a contact point and contact normal line calculation method for processing/assembly apparatuses, having the ability to reduce contact point calculation errors due to errors in the force measurement device in both the direction of movement and the direction perpendicular to movement. The invention calculates the points and normal lines of contact between a tool and a product being processed by running, in order, a force application line calculation procedure to calculate the force application line from the signal output from the force measurement device; a intersection point calculation procedure to calculate the intersection point between the force application line and the tool by using information about the geometrical shape of tool; a dot product calculation procedure for determining the dot product between the translation velocity and the normal vector; a boundary distance calculation procedure to calculate the boundary distance to the boundary area; a force effect distance calculation procedure to calculate the force effect distance; and a function calculation procedure to calculate a function of the chosen points over the dot product, the force effect distance, and the boundary distance; taking the calculated function as a final determining function and taking the point within the chosen points which minimizes the final determining function and the corresponding normal vector as the contact point and contact normal line.

5 Claims, 11 Drawing Sheets

| LINK | LENGTH mm |
|------|-----------|
| L1   | 500       |
| L2   | 400       |
| L3   | 47        |

*) $e_{wkv} = D\, e_{wkf} \times e_{wkn}$
   $(D = \pm 1)$

METHOD OF CALCULATING POINTS AND NORMAL LINES OF CONTACT AND APPARATUS THEREFOR

This is a continuation application of application Ser. No. 08/335,974, filed Nov. 4, 1994 (abandoned).

BACKGROUND OF THE INVENTION

1. Technical Field of the Invention

The present invention relates to a method of calculating the points and normal lines of contact of the tools or parts on a processing or assembly apparatus for use in such broad applications as repetitive work requiring processing along the surface of the product, or assembly work requiring contact between parts. The present invention also pertains to a control device for controlling an apparatus for processing or assembly.

2. Related Art

Concerning apparatuses in the prior art for determining the contact points between the tools/parts of processing/assembly apparatuses and the products being processed/assembled, especially in the case of robotic arms, examples are reported in the following documents.

Izumi, et al., disclose a contact point determination method which uses reaction force information in "The Japanese Robotics Society Journal", vol. 4, no. 2, pages 27 through 34. Izumi's method enables detection of contact points based on a limited number of force components by modeling friction forces. However, the method assumes that the friction coefficient between the tools and work piece or the friction force between parts is known. Therefore, Izumi's method is not applicable to the situations wherein the friction coefficient is not known or the friction coefficient varies during processing or assembly operations. Furthermore, since the error in the force measurement is supposed to be negligible in Izumi's method, contact points thus detected tend to contain error which is originated from the error in the force measurement.

Kitagaki, et al., disclose a method of determining the contact point based on the deviation force vector calculated when the load weight is changed by controlling the orientation without changing the contact point in "The Japanese Robotics Society 8th Convention Abstract (1)," page 395 through 398. According to Kitagaki's method, contact points are detected without referring to the pre-inputted data regarding configuration of the tool. However, the method has a shortcoming that the operation such as grinding etc., must be stopped while the orientation of the tool is being changed and force data is being obtained. Therefore, the method is not suitable for repetitive operations wherein the orientation of the tool is predetermined or not suitable for the operations wherein the contact point varies when the orientation of the tool is changed.

A method for determining the normal line of contact using the three force components from a force measurement device is reported in Japanese Patent Application First Publication No. Hei 3-256103. The method disclosed therein is not suitable for the situations wherein the friction force between the tool and workpiece or between parts are not negligible or the situations wherein contact points vary because the contact points between the tool and the work piece are supposed not to change during operation.

In the technologies described above, an additional problem is the error in force measurement derived from the weight or acceleration of the tool and parts. Even though efforts are made to reduce the measurement error by considering the weight, gravity center, inertial moment, geometry of the robot arm, the error in force measurement is not effectively reduced because of the difficulty in obtaining information regarding the parameters described above.

Furthermore, it is crucial that the technologies described above are not essentially capable of eliminating error in the force measurement which might be caused due to various sources such as temperature variation, hysteresis, non-linearity in various phenomena.

A contact point determination technology described on page 127 of "The Japanese Robotics Society Journal", vol. 11, no. 3 is a method of calculating the normal lines and points of contact in which a determination function is calculated from the distance between the surface which the force application line crosses and chosen points located on the tool surface, and the dot product of the translation velocity and the normal vector, and the contact point and contact normal line are determined by the chosen point which minimizes the determination function. This method is applicable to situations wherein friction force varies and the contact points varies during operation because the geometry of tool is pre-inputted, and the contact point is determined as the cross point of the force vector and the surface of the tool defined by the pre-inputted geometrical data. The measurement errors due to weight of the tool and work pieces, variation of the temperature, hysteresis, non-linearity can be taken into account. However, the method is less effective with regard to the suppression of the error component in the direction perpendicular to the direction of translation of the tool.

In the unknown boundary estimation method given on pages 289 and 290 of "The Abstract of the 1989 Measurement Automatic Control Science Convention", a boundary direction estimation method is demonstrated which takes the effect of friction into consideration by removing the velocity component from the direction of the force components, but in this method, the contact point between the end effector and the object being worked on must always be fixed during the task specifications, or the translation velocity of an arbitrary point on the end effector must be fixed, meaning that the area of possible application only includes work which does not include changes in the orientation during the procedure, and there is a problem in that the application to cases in which the contact point or orientation changes is difficult.

A. Bicchi et al., disclose a method for detecting a contact point wherein the friction force component in the direction perpendicular to the direction of contact is taken into consideration instead of assuming that the crossing point of the direction of force with the surface of the object is the contact point, in "Contact Sensing from Force Measurements", The International Journal of Robotics Research, Vol. 12, No. 3, Massachusetts Institute of Technology, June 1993. Even though the method employs all the possible friction components, the method is not effective in suppressing the error in force measurement because the method assumes that the measurement of force components are exact.

SUMMARY OF THE INVENTION

In light of the problems in the related technology described above, a method of determining the contact point is provided according to one aspect of the present invention. The method is capable of accurately determining the contact point of the tool and work piece, and effectively suppressing the error in the direction perpendicular to the direction of movement of the tool which is due to the error in the measurement of force component in the same direction. The present invention also provides, according to its second aspect, a control apparatus for an apparatus for processing or assembly wherein the method for determining the contact point described above is employed.

According to the first aspect of the present invention, there is provided a method concerning the determination of the points and normal lines of contact in a processing and assembly apparatus which has the ability to calculate the velocity/angular velocity and the three-dimensional position/orientation of the parts maintained in the tools and end effectors occupying the workspace of said apparatus, a contact point and normal contact line calculation method in which (a) a procedure for calculating the location of the lines along which force is to be applied, by determining the return force applied on said tools or said parts from a force output signal received from a force measurement device, provided between a work output device located on the extremities of said apparatus and said tools or said end effectors provided thereon;

(b) a procedure for calculating the intersection points of the above-mentioned force application lines and said tools/parts, by utilizing pre-entered data about the geometrical shapes of said tools/parts;

(c) a procedure for calculating the dot products of normal vectors and translation velocities, the positions of said normal vectors being determined by choosing multiple points in the neighborhood of said intersection points on the surfaces of said tools/parts, and said translation velocities determined for each chosen point mentioned above by the previously mentioned velocity or position determination apparatus;

(d) a procedure for calculating boundary distances, determined by taking the distances between said chosen points and a pre-determined boundary area as said boundary distances;

(e) a procedure for calculating force effect distances, determined by taking the distances between said chosen points and said intersection points or said force application lines as said force effect distances; and (f) a procedure for calculating a function for said chosen points from said dot products, said boundary distances, and said force effect distances;

are run in order, said function is taken as the final determination function, and the chosen point which minimizes said final determination function and its corresponding normal vector are returned as the contact point and normal contact line of said tools/parts and the product being processed/assembled.

According to the second aspect of the invention, there is provided an control device for processing or assembling apparatus comprising:

(a) a data memorization means to store in memory the three-dimensional position/orientation of said end effector or the position/angle of each robotics joint;

(b) a means for memorizing the task specifications;

(c) a contact point calculation means to calculate the point of contact of said end effector using a determining function constructed based on the three-dimensional position/orientation of said end effector or the position/angle of each robotic joint, and the application force, as well as the data on the three-dimensional position/orientation of said end effector or the position/angle of each robotic joint stored in memory by the data memorization means;

(d) a path generation means to generate a target path for said contact point on the object being worked on; and (e) a target value generation means for generating a robot control target value from the target path on said object being worked on and said task specifications.

Because the method of determining the contact point according to the first aspect of the present invention makes use of the above-mentioned methods, utilizing geometrical shapes for their tools/parts and values for the intersection points with the force application line which are not affected by friction, applications are possible even with fluctuations in friction and the frictional coefficient, and fluctuations in the contact points between the processing/assembly devices such as robotic arms and the product being processed/assembled.

Furthermore, using a measuring signal for a position or velocity measurement device which does not increase the error due to acceleration or environmental temperature changes, multiple chosen points are set in the neighborhood of the above-mentioned intersection points on the surface of the tools/parts, and the dot products between the normal vectors of the intersection points and the translation velocity are taken. Then a function calculation procedure in which the distances between the chosen points and said intersection points on the tools/parts is determined and a function is calculated for the dot products of each chosen point is run.

Because the measurement calculation method takes said function as the final determination function and minimizes the final determination function over all of said chosen points and takes the corresponding point and normal vector as the contact point and contact normal line, the problem of the prior art in which the errors due to the weight and acceleration of the processing/assembly devices, temperature changes of the force measurement device; hysteresis, and non-linearity could not be lessened is eliminated, and the application to repetitive work which requires the standardization of the orientation or force is possible.

In addition, concerning the direction perpendicular to the movement direction during translation, a boundary distance calculation procedure in which the distance from the chosen points to a pre-set boundary area is calculated and a function calculation procedure in which a function including the relevant boundary distance for each chosen point is calculated are run. Said function is taken as the final determination function and, within the chosen points, the point and its corresponding normal vector which minimizes the final determination function is taken as the contact point and contact normal line between said tools/parts and the product to be processed/assembled. As a result, the problem in the prior art in which the ability to reduce the force measurement errors in the direction perpendicular to the direction of movement during translation was lessened is eliminated.

The control device according to the second aspect of the present invention does not treat the position of the contact point on the end effector as fixed during the procedure, instead it uses the contact point calculation means in order to calculate the determining function from the three-dimensional position/orientation of the end effector or the position/angle of each robotic joint, and the data on the three-dimensional position/orientation of the end effector or the position/angle of each robotic joint stored in memory by the data memorization means which are not affected by fiction, generates a path, and then generates a control target value, so it has the ability to obtain a target path on the object being worked on in real time which is applicable with force measurement errors and friction, fluctuations in the friction at the contact point, or changes in the position of the contact point during the procedure.

DETAILED DESCRIPTION OF THE INVENTION

An embodiment of the present invention will be explained with reference to the drawings.

Figure 1:
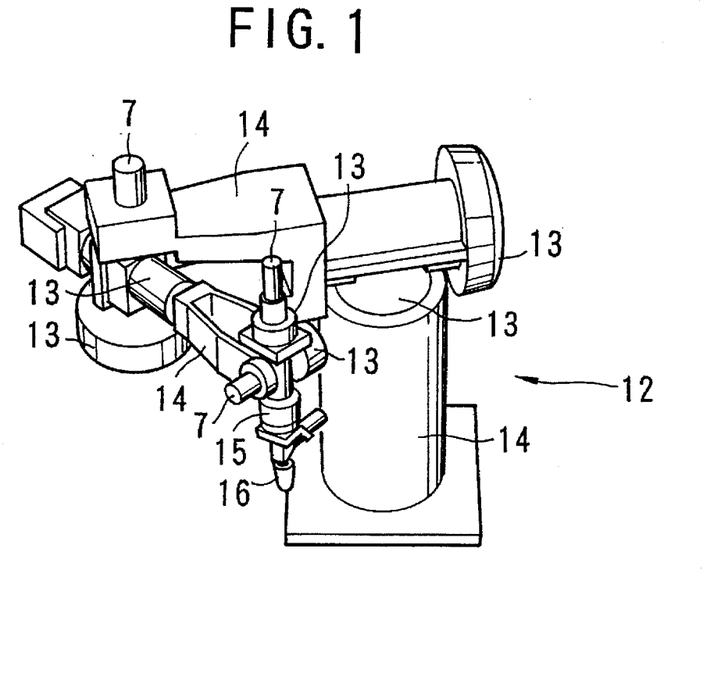
FIG. 1 is a figure depicting a robot art to which the present invention is applicable.

FIG. 1 depicts a robot arm to which the present invention is applicable. Robot arm 12 has links 14 which are rotatable by actuators 13 active in the longitudinal or rotational directions. The links have encoders 17 for measuring the length or rotational angle of the links. At the distal end of the robot arm, a grinder is held via force detector 15. The robot arm can make the grinder contact the work piece from any desired direction by appropriately determining the length and angle of the arms. The position and angle of the grinder is calculated by the measurement of the encoders.

Figure 2:
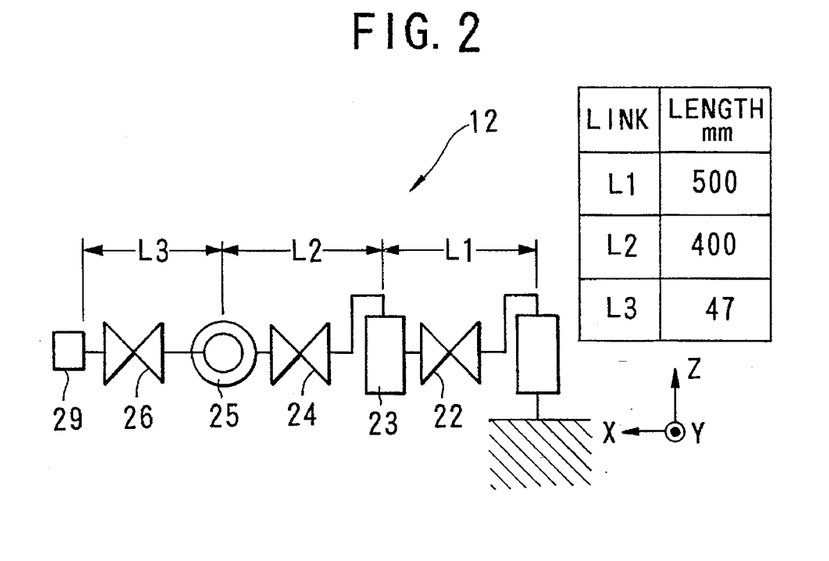
FIG. 2 is a schematic diagram showing the degrees of freedom of each joint and the lengths of each link on a robotic arm which applies to this invention.
Figure 3:
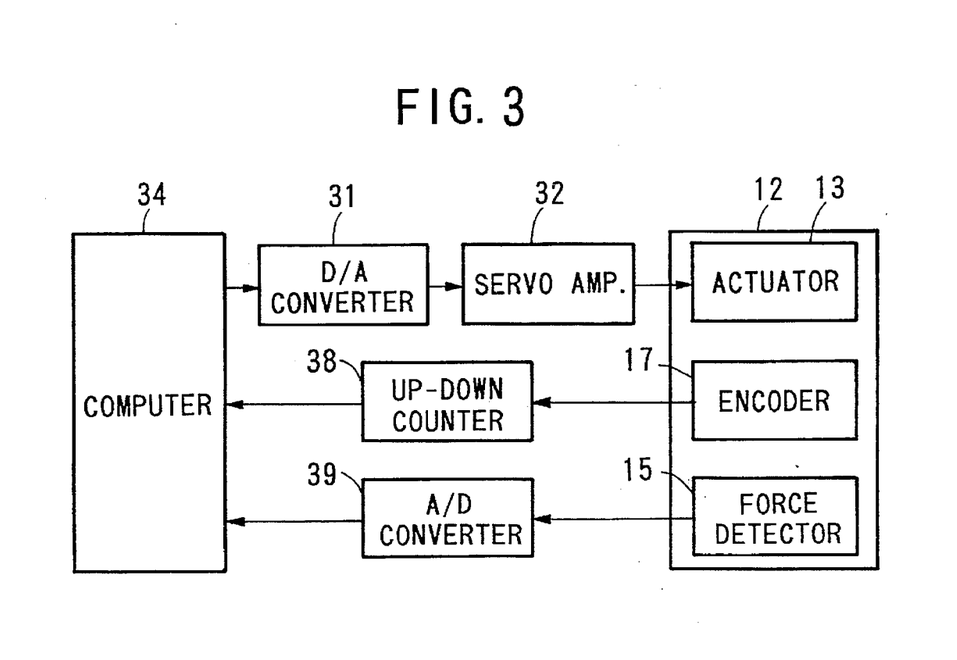
FIG. 3 is a control diagram for the above system.

FIG. 2 is a diagram showing the freedom of movement of each of the joints and the length of each link of a robotic arm used in this embodiment, and FIG. 3 is a control structure plan showing a robotic arm.

In the figures, 12 corresponds to a robotic arm having six degrees of freedom including three axial rotations and three axial revolutions, 21–26 each correspond to a joint of robotic arm 12, 17 corresponds to an encoder attached to each joint in the robotic arm, 38 corresponds to an up-down counter, 15 corresponds to a force measurement device attached to the end of robotic arm 12, 39 corresponds to an A/D converter, 31 corresponds to a D/A converter, 32 corresponds to a servo amp, 13 corresponds to an actuator, 34 corresponds to a computer to run the calculations needed in order to determine the points of contact and the normal lines of contact from the control actions of the entire robotic arm and the present embodiment.

The robotic arm 12 to which the present embodiment applies basically contains the above features, but a detailed description of the calculation method for the contact points and contact normal lines to be used by said robotic arm according to the present embodiment will be explained below with reference to the drawings.

Figure 4:
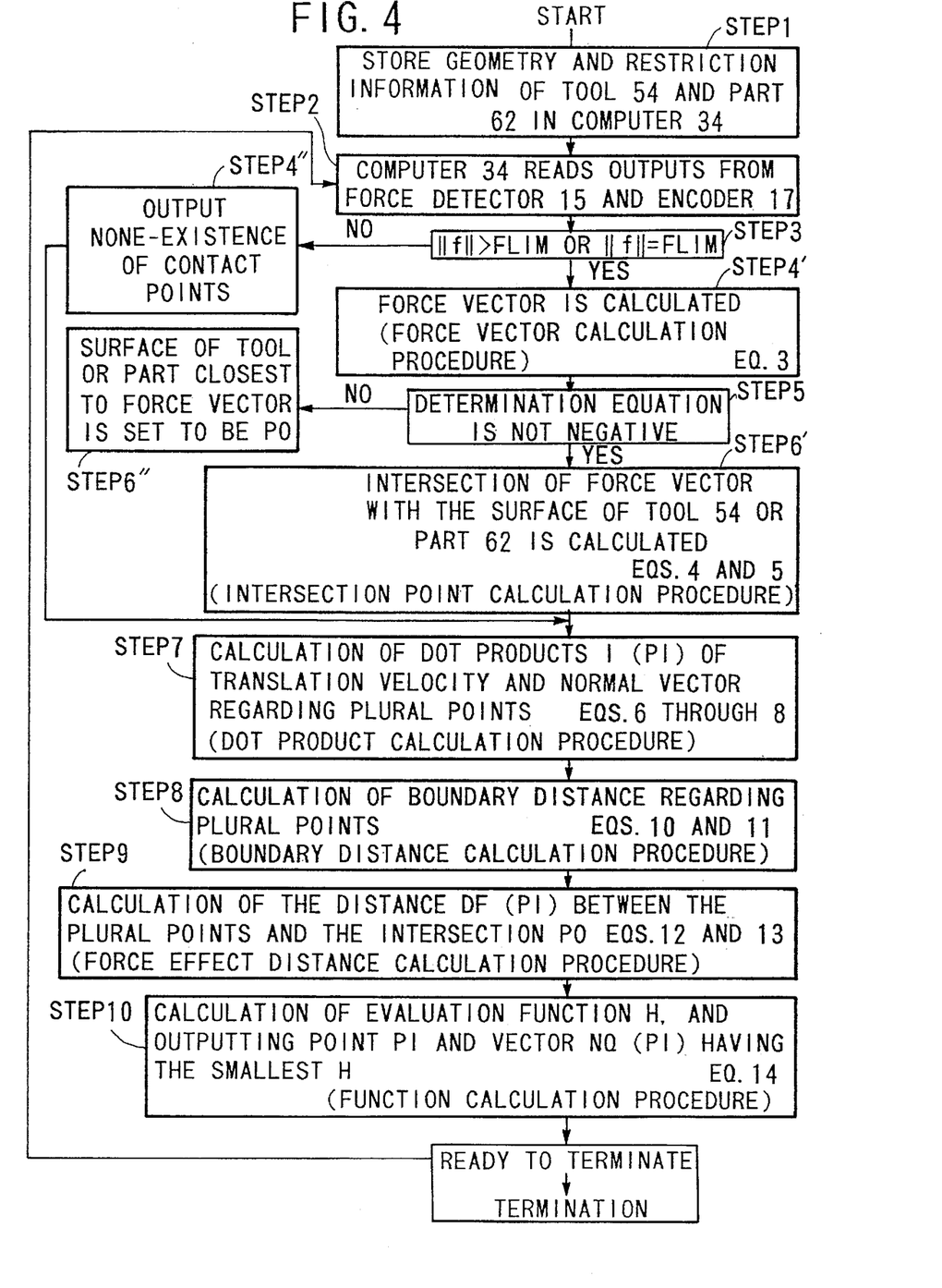
FIG. 4 is a flow chart explaining an embodiment of the present invention.
Figure 5:
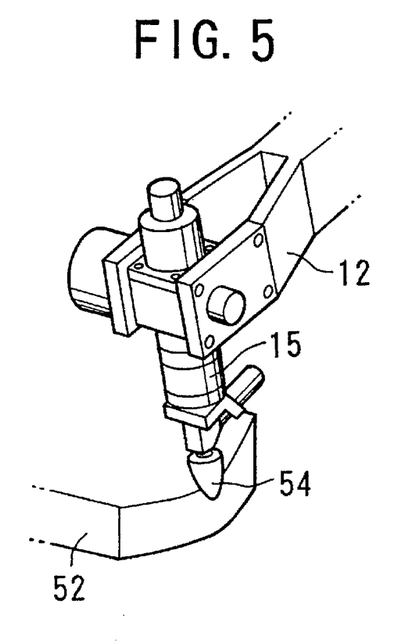
FIG. 5 is a diagonal view of an example of a product being processed and a tool attached to the end of a robotic arm which applies to the above embodiment.
Figure 6:
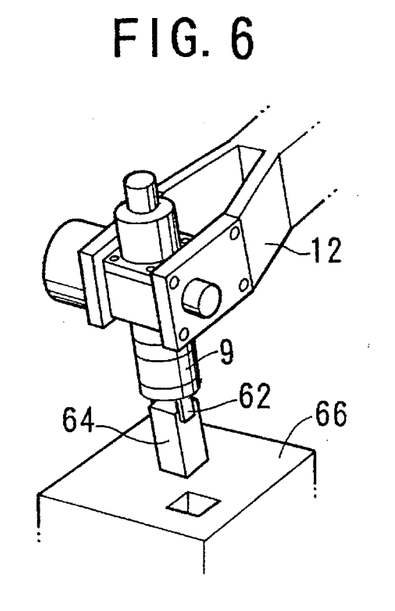
FIG. 6 is a diagonal view of a product being assembled and a part held by an end effector of a robotic arm which applies to the above embodiment.

FIG. 4 is a flow chart explaining the procedure in the present embodiment, FIG. 5 shows a diagonal view of a product being processed by a tool attached to the end of a robotic arm, for explaining the methods used in the present embodiment, and FIG. 6 shows a diagonal view of a product being assembled and an end effector attached to the end of a robotic arm. In the figures, 62 corresponds to an end effector, 52 corresponds to a tool, 54 corresponds to a product being processed, 64 corresponds to an assembly part, and 66 corresponds to a product being assembled.

Below, regarding the product being processed 54 by the tool 52 attached to the end of robotic arm 12 shown in FIG. 5 and the product being assembled 66 by the end effector 62 on the robotic arm 12 shown in FIG. 6, we will explain the details of the measurement calculation method in the case that the surface shape of the part of the product being processed 54 or the product being assembled 64 at the point of contact of the tool 52 or the part 64 is able to be described by a quadratic surface, such as in the case of a cylinder, ellipse, or sphere.

First, concerning the geometrical information, a fixed fingertip coordinate system is set above the axis of symmetry of the surface of the tool 52 or part 64, and a three-by-three matrix M representing the above-mentioned surface shape is entered into computer 34 (see step 1). At this time, said surface shape can be represented by equation (1) given below. Additionally, the vector normal to the surface is represented by equation (2).

$$x^T M x = 1 \qquad (1)$$

$$n(x) = Mx/\|Mx\| \qquad (2)$$

x: the three-dimensional surface position vector due to the fixed fingertip coordinate system M: three-by-three matrix n(x): the outward pointing normal vector at x on the fixed fingertip coordinate system, wherein $\|.\|$ represents the length of the vector Force Application Line Calculation Procedure When tool 52 or part 64 contacts a fixed product being processed 54 or assembled 64 at one point, as shown in FIG. 4 step 2, utilizing the values of the return force on the previously mentioned fixed fingertip coordinate system taken from the measured signal stored in computer 34 from A/D converter 39, an equation representing the force application line is calculated using equation (3) given below (see step 4').

$$L = u \times uo + tu \quad (3)$$

wherein:

$u = f/\|f\|$, $uo = (mo-(mo \cdot u))/\|f\|$

L: the three-dimensional position vector on the force application line in the fixed fingertip coordinate system t: parameter f: the return force vector in the fixed fingertip coordinate system mo: the return force moment vector in the fixed fingertip coordinated system Regarding step 3, if $\|f\|$ is equal to zero, or if it is less than a pre-set limit Flim, then a contact point does not exist (see step 4").

Intersection Point Calculation Procedure

The intersection points between the previously mentioned surface shape and the force application line is calculated with equation (4) given below (see step 6').

$$po = u \times uo + t'u \quad (4)$$

wherein:

po: the three-dimensional position vector representing the intersection point between the surface shape and the force application line in the fixed fingertip coordinate system $t' = (-b \pm \sqrt{(b^2 - 4ac)})/(2a)$ $a = u^T M u$ $b = u^T M (u \times uo) + (u \times uo)^T M u$ $c = (u \times uo)^T M (u \times uo) - 1$ Here, there are usually two solutions for t', but since the force due to the contact pushes towards the robotic arm 12, the t' which satisfies the following equation (5) is used.

$$u \cdot n(u \times uo + t'u) \leq 0 \quad (5)$$

The values for po and n(po) determined as above, in the case in which there are no errors due to the weight or acceleration of part 64 or tool 52, temperature changes of the measurement device 15, hysteresis, or non-linearity of the measurement device 15, represent the contact point and the contact normal line, and in an ideal situation such as this, the positive value is always taken in the discriminant "$b^2 - 4ac$" of equation (4) (see step 5).

However, because there are usually several reasons for errors in the measurement device 15, the following procedure will take measures to lessen the effect of errors in the measurement device 15. However, if the negative value is taken for the discriminant "$b^2 - 4ac$", then the point on the surface of tool 52 or part 64 lying closest to the force application line L is taken as po and the following procedure is run (see step 6").

Dot Product Calculation Procedure (Step 7)

First, using the displacement of the joint angles recorded in computer 34 through up-down counter 38 from encoder 17 attached to each joint 1–6 on the robotic arm 12, calculating the joint angular velocity by operating a difference or pseudo-differential filter, the velocity of the origin of the fixed fingertip coordinate system as seen from a absolute coordinate system is calculated as in equation (6) below.

$$(V^T \omega^T) = J(\dot{\theta}_1 \, \dot{\theta}_2 \, \dot{\theta}_3 \, \dot{\theta}_4 \, \dot{\theta}_5 \, \dot{\theta}_6)^T \quad (6)$$

V: the translation velocity vector of the origin of the fixed fingertip coordinate system as seen from the absolute coordinate system ω: the angular velocity vector of the origin of the fixed fingertip coordinate system as seen from the absolute coordinate system J: Jacobian matrix $\dot{\theta}_1 - \dot{\theta}_6$: the joint angular velocities of joints 1–6

Figure 7:
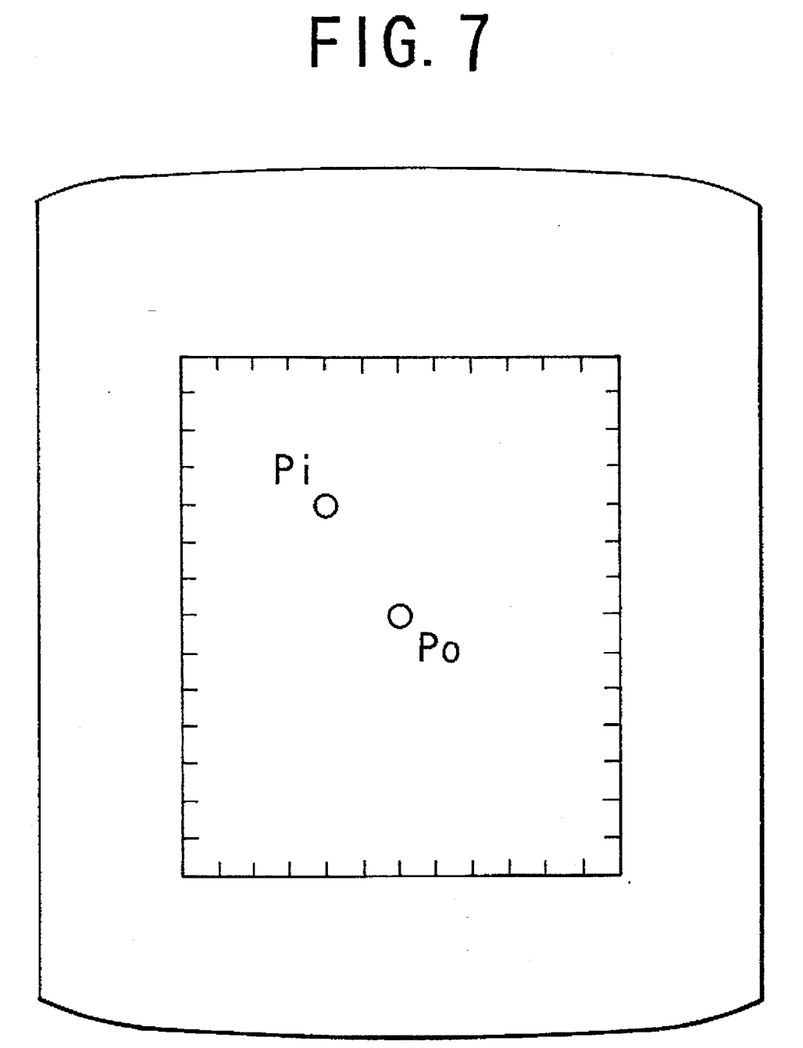
FIG. 7 is a diagram showing an example of the chosen points in the neighborhood of the intersection point between the surface shape and the force application line according to the above embodiment.

Next, in the neighborhood of the intersection po between said surface shape and the force application line, n×m chosen points are set such as is shown in FIG. 7, and the translation velocity vector is calculated for each chosen point using equation (7) given below. Similarly, equation (8) is used to determine the normal vector at each of the chosen points.

$$Vi = V - Rpi \times \omega \quad (7)$$

Vi: the translation velocity vector as seen from the absolute coordinate system for chosen point i (1–n×m)

pi: the three-dimensional position vector of chosen point 1 on the fixed fingertip coordinate system R: the coordinate system conversion matrix from the fixed fingertip coordinate system to the absolute coordinate system $$nw(pi) = Rn(pi) \quad (8)$$

nw(pi): the normal vector at chosen point i on the absolute coordinate system

From this, the dot product I(pi) between the normal vector and the translation vector for each chosen point is calculated using equation (9) below.

$$I(pi) = Vi \cdot nw(pi) \quad (9)$$

Boundary Distance Calculation Procedure (Step 8)

Now, an explanation will be given using the example that the boundary area is a flat surface. First, a point on the flat surface as seen from the fixed fingertip coordinate system is called q, and the corresponding normal vector is called nq. Then, the boundary distance Dp(pi) can be calculated from equation (10) given below.

$$Dp(pi) = |np \cdot (pi - q)| \quad (10)$$

Here, the symbol |·| represents an absolute value.

This boundary distance does not only apply to flat surfaced boundary areas, it is also possible to apply it to curved surfaces such as cylinders or spheres. For example, consider the case in which we apply it to the rim of a hole on the surface of a sphere the axis of which does not pass through the center of the sphere. Generally the shape of the rim of this hole in this case is quite complicated, but the application of the boundary distance Dp(pi) of the present embodiment is made possible by taking the original surface of the sphere as the boundary area.

Therefore, if the boundary area as seen from the fixed fingertip coordinate system is taken as the sphere with center at point op and radius d, the boundary distance Dp(pi) may be calculated using equation (11) given below.

$$Dp(pi) = \{d - \|pi - op\|\} \quad (11)$$

Force Effect Distance Calculation Procedure (Step 9)

Next the distance from the chosen point to the previously mentioned intersection point, or, the distance from the chosen point to the force application line is calculated and called the force effect distance. If the force effect distance is taken as Df(pi), then it is possible to calculate using the equations (12) and (13) given below.

$$Df(pi)=\|po-pi\| \quad (12)$$

$$Df(pi)=\|(u\cdot pi)u+u\times uo-pi\| \quad (13)$$

Function Calculation Procedure (Step 10)

Using this as a basis, the linear determining function H is calculated for each chosen point using equation (14) given below.

$$H=\gamma\Pi(pi)+\delta Df(pi)+\epsilon Dp(pi) \quad (14)$$

wherein $\gamma$, $\delta$, and $\epsilon$ are weighting coefficients

Then, the chosen point which minimizes the determining function H is taken as the point of contact between the tool 52 or part 64 and the stationary product to be processed 54 or assembled 64, and the normal line at this point is taken as the normal line of contact.

The point and normal line of contact derived from the above procedure; even if errors in the measurement device 15 due to such factors as the weight or acceleration of the tool 52 or part 64, temperature changes of the measurement device 15, hysteresis, or non-linearity do exist; makes possible the lessening of the effect of measurement errors of the point and normal line of contact due to errors in the force measurement device 15 stemming from multiple factors because the contact point is corrected by utilizing information on the joint angle of robotic arm 12 the errors of which do not increase due to such factors as acceleration or temperature changes.

Furthermore, although in the explanation of the present embodiment given above an example was shown in which the surface shape of the tool 52 or part 64 was a curved surface such as a cylinder, ellipse, or sphere, if the procedure of the present embodiment is followed, the application to other shapes such as those composed of multiple planes such as rectangular or hexagonal pillars, those composed of a combination of planes and curved surfaces, or those composed of multiple curved surfaces is also possible. Additionally, it is also possible to apply the present embodiment to processing/assembly devices such as robotic arms with less than six degrees of freedom, or seven or more degrees of freedom, without any problems.

Experimental Example

Next, an experimental example of the present invention is given.

In the experiment, a polishing tool of radius 7.5 mm was attached to the end of force measurement device 15 connected to the end of robotic arm 12, an aluminum plate of radius 160 mm was fixed horizontally, and the measurement signal of the force measurement device 15 and the encoder 17, in an operation in which the robotic arm 12 contacts the control tool with one point on the edge of the aluminum plate, was measured at a sampling period of 0.16 sec between successive measurements.

Figure 8:
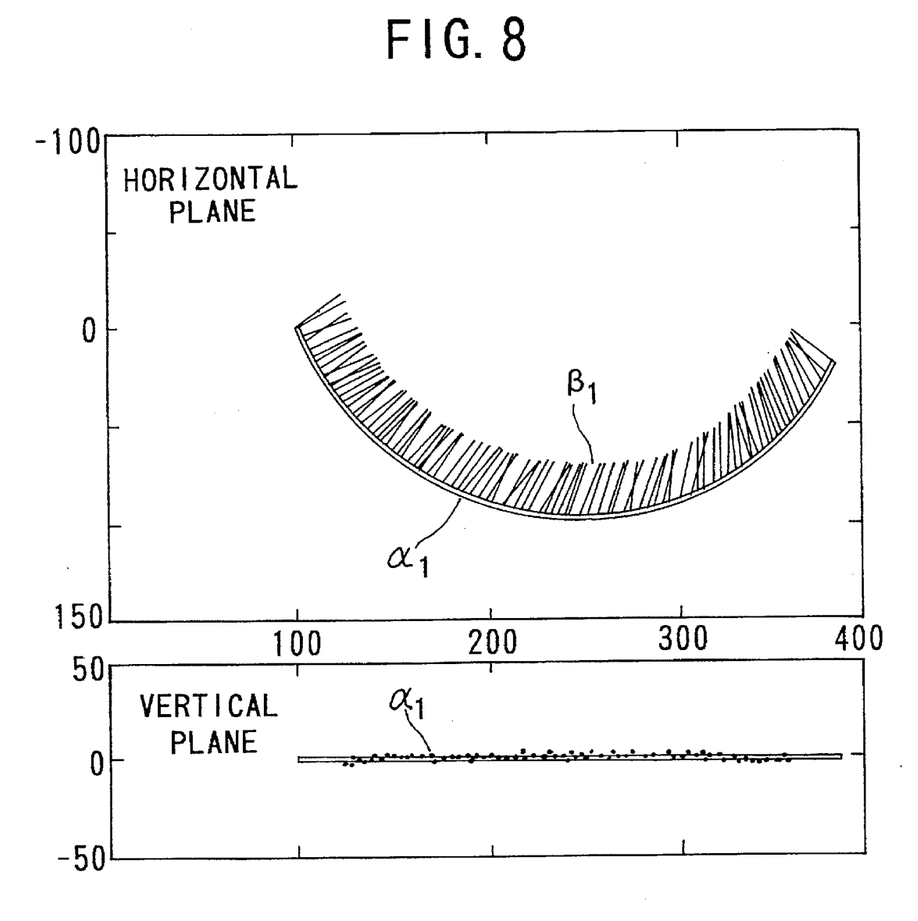
FIG. 8 is, regarding the experimental example of the present invention, a graph plotting the intersection point between the surface shape and the force application line and the corresponding normal vector according to the prior art.

In FIG. 8, the locus $\alpha 1$, on the absolute coordinate system, of the intersection point between the surface of the tool 52 and the force application line as calculated using equations (4) and (5), and normal vector $\beta 1$ of the tool 52 surface at said intersection point, are shown. Here, the locus $\alpha 1$ on the absolute coordinate system representing the intersection point between the tool 52 surface and the force application line represents the edge of the aluminum plate, and normal vector $\beta 1$ on the surface of tool 52 represents the normal vector of the aluminum plate.

Looking at FIG. 8, it is apparent that the normal vector $\beta 1$ is full of errors when compared with a circle of radius 160 mm. This error is due to errors in measurement of the force measurement device due to acceleration, temperature changes of the force measurement device 15, hysteresis, and non-linearity.

Figure 9:
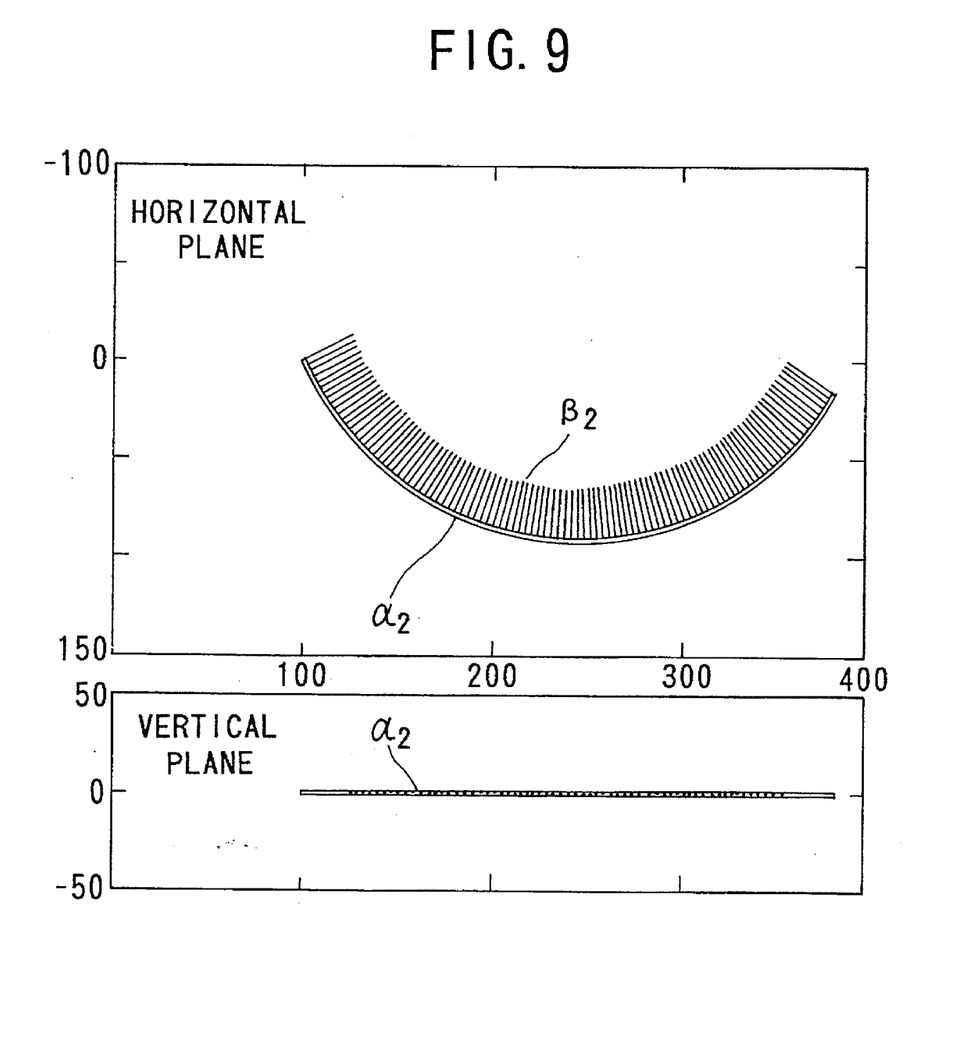
FIG. 9 is a graph of the same plotting the locus of the calculated contact point and corresponding normal vector.
Figure 10:
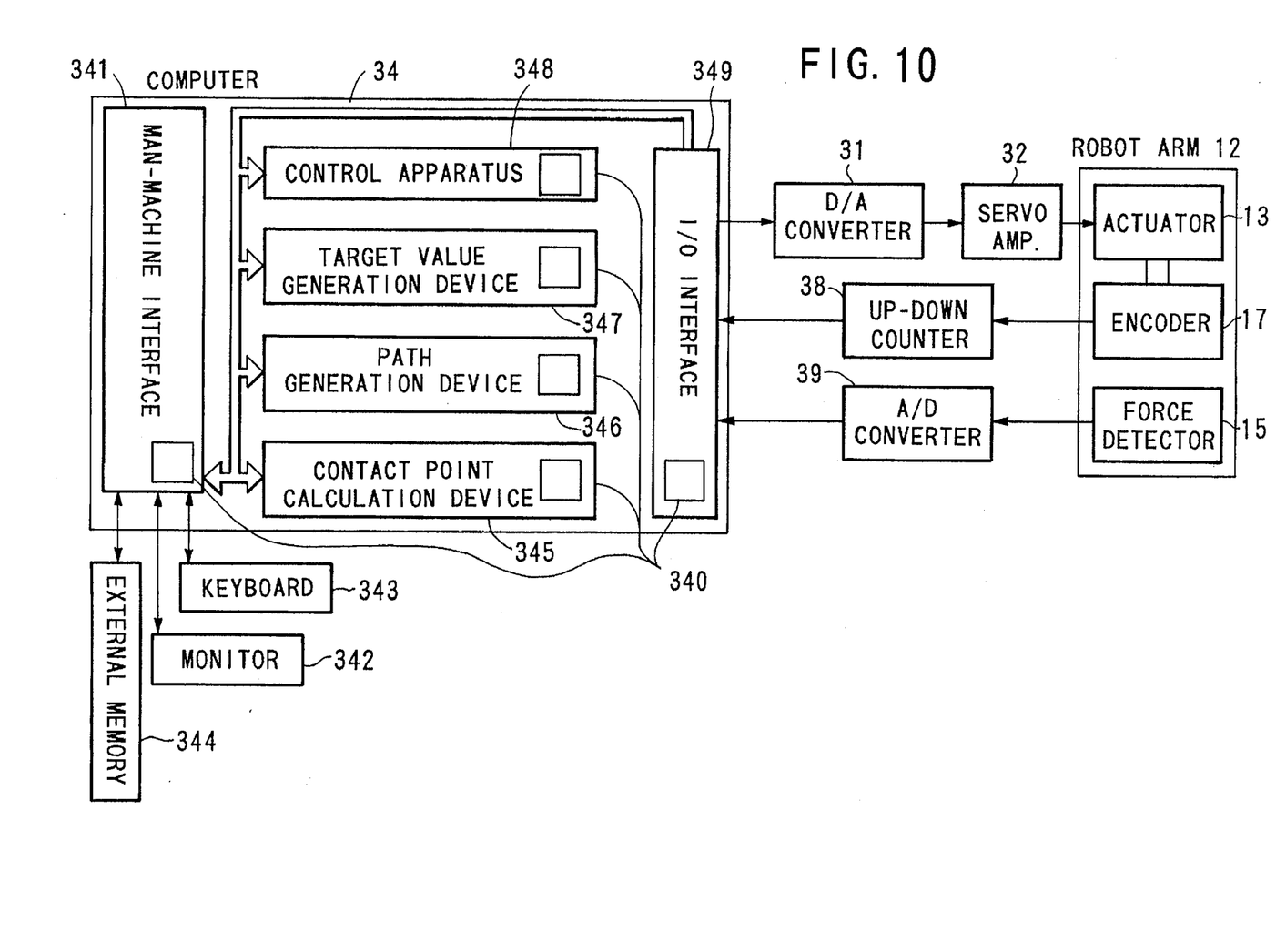
FIG. 10 is a diagram showing the control device according to the second aspect of the present invention.

FIG. 9 shows the result when the same data used in FIG. 8 is used in the calculation according to the present embodiment. Compared with FIG. 8, the calculated normal vector $\beta 2$ in FIG. 9 is greatly improved. Looking at the locus $\alpha 2$ of the contact point, it is possible to confirm that the errors in both the direction of movement and the perpendicular direction are reduced.

In this way, the functionality of the feature reducing the errors in the force measurement device 15 according to the present embodiment has been proved.

As shown above, according to the method of the present invention, it becomes unnecessary to perform such tedious tasks as pre-determining the frictional coefficients such as was necessary in the prior art. Additionally, because information regarding the control side is not used at all, application without any kind of change is possible whether the method used is one in which the robotic arm directly controls the force, one in which the force is indirectly controlled, or one in which there is no control whatsoever.

Furthermore, the present invention exhibits remarkable utility and convenience as demonstrated by its ability to cope with fluctuations in the friction and frictional coefficient of the contact point and fluctuations in the contact point between the robotic arm and the product being processed/assembled, which the prior art could not; its ability to correct errors in the force measurement device, which the prior art could not do; the possibility of its application to repetitive work which requires fixed orientations and application forces; and its ability to determine the contact points and normal lines without regard to the type of control used by the robotic arm on the product being processed/assembled.

The embodiments of the control device according to the present invention will be explained in detail with reference to the figures.

FIG. 2 is a schematic showing the degrees of freedom of each joint and length of each link in a robotic arm to which an embodiment of the present invention applies.

In the figures, 12 corresponds to a robotic arm having six degrees of freedom including three axial rotations and three axial revolutions, 21 corresponds to the first joint from the base of robotic arm 12, 22 corresponds to the second joint from the base of robotic arm 12, 23 corresponds to the third joint from the base of robotic arm 12, 24 corresponds to the fourth joint from the base of robotic arm 12, 25 corresponds to the fifth joint from the base of robotic arm 12, 26 corresponds to the sixth joint from the base of robotic arm 12, 17 corresponds to an encoder attached to each joint in the robotic arm, 38 corresponds to an up-down counter, 15 corresponds to a force measurement device attached to the end of robotic arm 12, 39 corresponds to an A/D converter, 31 corresponds to a D/A converter, 32 corresponds to a servo amp, 13 corresponds to an actuator, 34 corresponds to a computer which runs the calculation/memorization of information needed for the overall control of robotic arm 12. Computer 34 is comprised of the following parts. 341 corresponds to the man-machine interface which is the input means for the operator, and it is attached to the monitor 342, the keyboard 343, and the outside memory device 344. 345 corresponds to the contact point calculation section needed for the contact point calculation means, 346 corresponds to the path generator needed to perform calculations for the path generation means, 347 orresponds to the target value generator which generates the control target value from the generated path and the task specifications, 348 corresponds to the control section for performing calculations needed for stiffness control of the generated control target value, 349 corresponds to the I/O interface, and each section has memory 340 and data communication means.

Below, using repetitive task specifications such as polishing or deflashing as shown in FIG. 5, the means composing the robot control device of the present invention are explained in order.

Data Memorization Means

Figure 12:
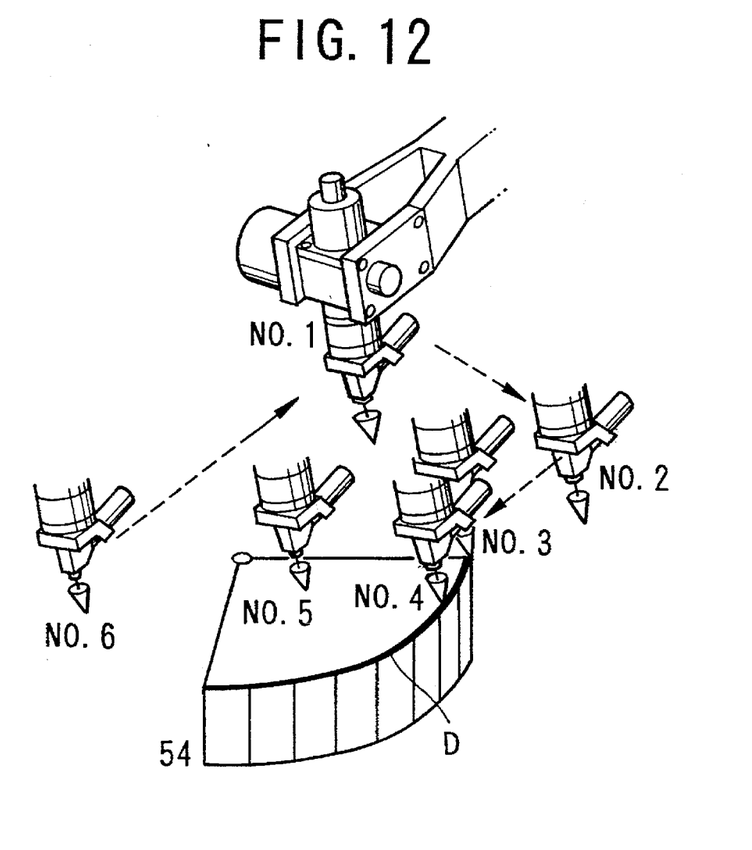
FIG. 12 is a diagram explaining the instructions from the operator according to an experimental example pertaining to the present invention.

First, FIG. 12 is a diagram showing the operation of the robotic arm 12 by the operator, the signals for each of the instruction points No. 1 through No. 6 from the encoder 17 on the robotic arm 12 go through the up-down counter 38 and are stored in computer 34. Through instruction points No. 1,2, and 6, joint angle data on robotic arm 12 for approaching or breaking away from the object being worked on 54 is stored. Additionally, instruction point No. 3 is the procedure starting point, the direction from instruction point No. 3 to point No. 4 is the initial path, stored as the plane composed from points No. 3, 4, and 5. The data on this plane can be stored in the computer 34 by storing, for example, the two three-dimensional vectors given by the normal vector np and a point of the plane q. It does not matter whether this information is due to direct control of the robot by an operator, remote control of the robot by a tuning pendant, or information obtained from a different computer such as a CAD system.

Task specifications Memorization Means

Figure 11:
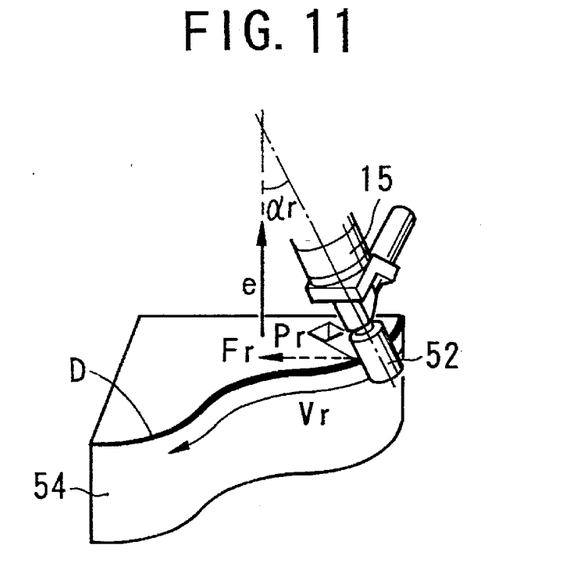
FIG. 11 is a diagram explaining an example of the setting of a coordinate system.

This is a means to store the desired task specifications in the computer 34. For example, the desired contact force Fr, tracking velocity Vr, contact position Pr, contact orientation αr, and work distance Sr of FIG. 11 are stored in computer 34. It is possible that these are constants or are variable in time, or else they may be functions dependent upon several data such as each specification or the angular velosity of the grinding tool. It is possible to decide the value of three-dimensional vector e which becomes the standard for the contact orientation in the figure by, for example, setting e=np, using the previously mentioned means as a basis.

Contact Point Calculation Means

Next, an example is shown wherein the contact point is calculated using the stored data as the basis.

For example, out of some chosen points spread sufficiently finely over the surface of end effector, the point at which the outward force direction of the force measurement device makes more than a 90 degree angle with the outward facing normal line of the chosen point and minimizes the determining function H shown in equation (15) is taken as the contact point.

$$H = |V(pi) \cdot N(pi)| + \beta \|(u \cdot pi)u + b - pi\| + \gamma |enp \, (pi-eq)| \quad (15)$$

Here, α, β, γ are weighting coefficients, pi is the chosen point position vector, V(pi) is the translation velocity of the chosen point, N(pi) is the normal vector on the chosen point pi, u is the outward force direction vector, b is the perpendicular vector to the force application line, enp and eq are np and q converted to the coordinate system on the end effector of the robotic arm. It is also possible to calculate at the same time the contact normal line by using the normal vector N(p) of the contact point p.

Path generation Means

The result which was reached by using the contact point calculation procedure in the absolute coordinate system becomes a dispersion point on the target path (D) on the object being worked on. Next, through the appropriate extrapolation, the target path (D) on the object being worked on is sequentially calculated. For example, it is possible to interpolate the dispersion points on the target path (D) on the object being worked on from the three path length functions shown in equation 16.

$$fx(s) = Mx3s^3 + Mx2s^2 + Mx1s + Mx0$$

$$fy(s) = My3s^3 + My2s^2 + My1s + My0$$

$$fz(s) = Mz3s^3 + Mz2s^2 + Mz1s + Mz0 \quad (16)$$

wherein s: path length

Mx3, Mx2, Mx1, Mx0

My3, My2, My1, My0

Mz3, Mz2, Mz1, Mz0: coefficients

The function in equation 16, for some of the dispersion points on the target path (D) on the object being worked on, for example, is extimated by the method of least squares, and thus the target path on the object being worked on is calculated sequentially.

Target Value Generation Means

Figure 13:
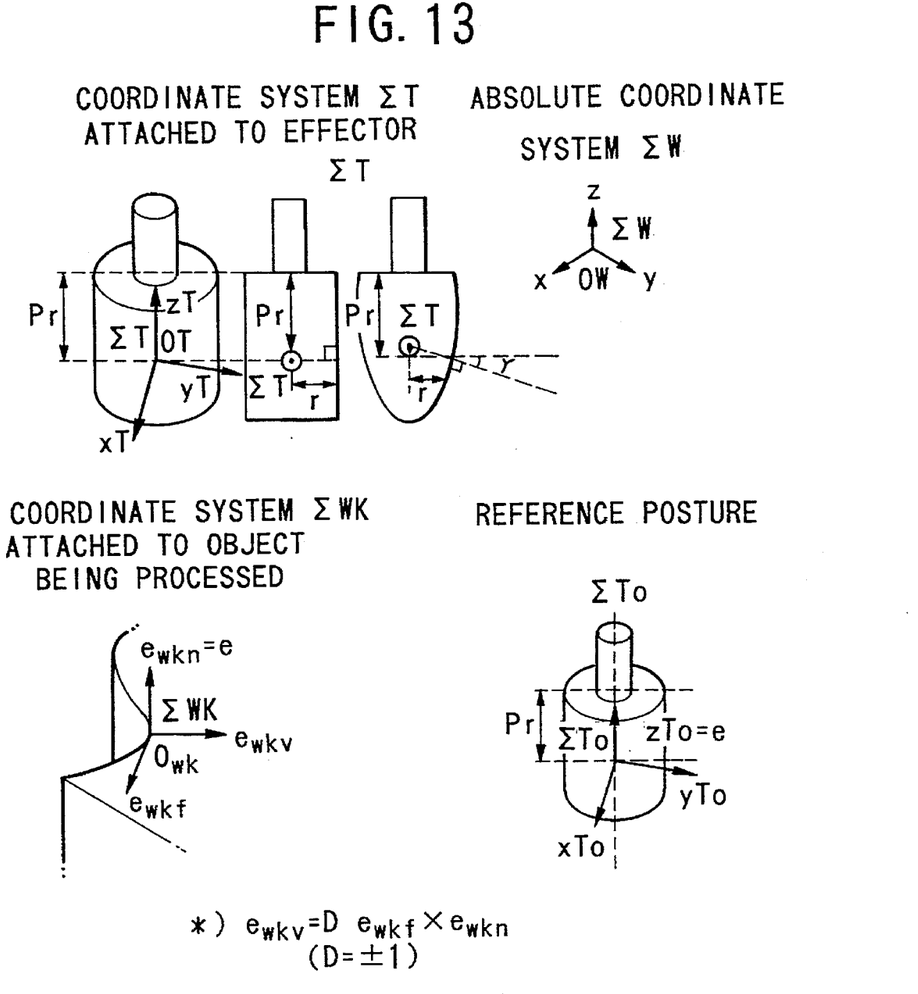
FIG. 13 is a diagram showing coordinate systems pertaining to the end effector, work piece, and the absolute coordinate.

Next the target value generation means is explained with the stiffness control of the task coordinate system as an example. FIG. 13 shows the setting of the coordinate system. For the coordinate system, $\Sigma_T$ is set for the end effector, $\Sigma_{WK}$ is set for the object coordinate system, and $\Sigma_W$ is set for the absolute coordinate system. The control is carried out by setting $\Sigma_{Tr}$ (the end effector target position and orientation) as the target track on the end effector coordinate system $\Sigma_T$. It is assumed that $\Sigma_T$ and $\Sigma_{Tr}$ are not affected by the rotation of the grinding wheel. Also, the coordinate system $\Sigma_{To}$ which represents the standard orientation is set as in the figure. Here, in the case in which the object coordinate system which should be contacted by the end effector at time T denoted $\Sigma_{WK(T)}$ determined from the previously mentioned trucking velocity and the previously mentioned target path on the object, its control target value $\Sigma_{Tr}(O_{Tr(T)}, X_{Tr(T)}, Y_{Tr(T)}, Z_{Tr(T)})$ can be determined from the task specifications given below.

First the target orientation $x_{Tr}(T)$, $y_{Tr}(T)$, and $z_{Tr}(T)$ is determined by taking it as the standard orientation $\Sigma_{To}(x_{To}, y_{To}, z_{To})$ rotated with respect to the axis eWKV(T) through an angle $\alpha' = -D(\alpha_{r-\gamma})$.

$$(x_{Tr}(T)y_{Tr}(T)z_{Tr}(T)) = R[eWKV(T), \alpha'](x_{To}y_{To}z_{To}) \quad (17)$$

R[k,θ]: a coordinate rotation about axis k through an angle θ

Next the position vector $P_{rc}(T)$ of the point on $\Sigma_{To}$ which should contact the end effector is determined by the following equation.

$$P_{rc}(T) = rR[e, \pi D/2]eWKV(T) - r(\tan \gamma)e \quad (18)$$

r: the radius of the end effector at Pr

γ: the angle between the end effect or normal line and the $x_{To}$-$y_{To}$ plane at Pr In this case, if $p_{rc}(T)$ over the orientation $(x_{Tr}(T)y_{Tr}(T)z_{Tr}(T))$ seen from $\Sigma_W$ is taken as $P'_{rc}(T)$, $$P'_{rc}(T) = R[eWKV(T), \alpha']p_{rc}(T) \quad (19)$$

In this way, the target position can be determined from the following equation in the case in which the stiffness of the $P'_{rc}(T)$ direction is K.

$$O_{Tr}(T) = O_{wk}(T) - P'_{rc}(T) + (F_r/K)P'_{rc}(T)/\|P'_{rc}(T)\| \quad (20)$$

The above is a target value generation example for stiffness control, but if some $\Sigma_{WK(T)}$ and a task specifications are provided, the generation of many different target values on the control side is possible.

According to the above procedures, the robotic work is put into practice as given below.

First, through the data memorization means and the task specifications memorization means, the relevant information is recorded in computer 34. The instructions of the operator are finished here. In the work proceeds first to the position/orientation of instruction point No. 1 given by the data memorization means and then moves to the position/orientation given by instruction point No. 2. Next, regarding the target path on the object being worked on from the starting point of the initial path, robotic arm 12 is moved to the task specifications starting point by moving the robotic arm 12 to the control target value calculated by the target value generation means which fulfills the memorized task specifications. Then it is moved along the initial path, after which the contact point calculation means, the path generation means, and the target value generation means are repeatedly run, and when the task specifications distance Sr is reached, it moves to instruction point No. 6 and then to instruction point No. 1, where it separates from the object being worked on, and the task specifications ends.

Experimental Example.

Next, the utility of the present invention is shown using an experimental example.

Figure 14:
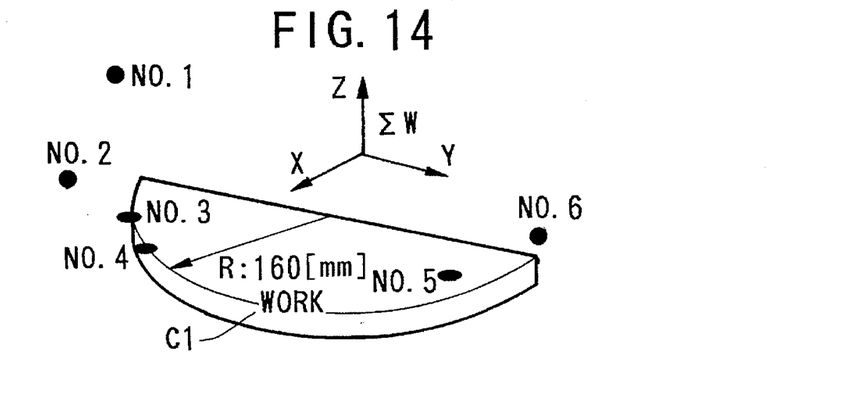
FIG. 14 is a diagram showing the teaching by the operator according to an example.

For the object being worked on, a half-disc of radius R=160 mm was used, and as shown in FIG. 14 three points on the object and three points for approach/breaking away totalling six points were entered prior to the procedure. For the tool a commercially available polishing tool of radius 7.5 mm was used, under work conditions with a set value for the number of rotations. However, for the instructions a tool with a cone-shaped end was used.

Figure 15A:
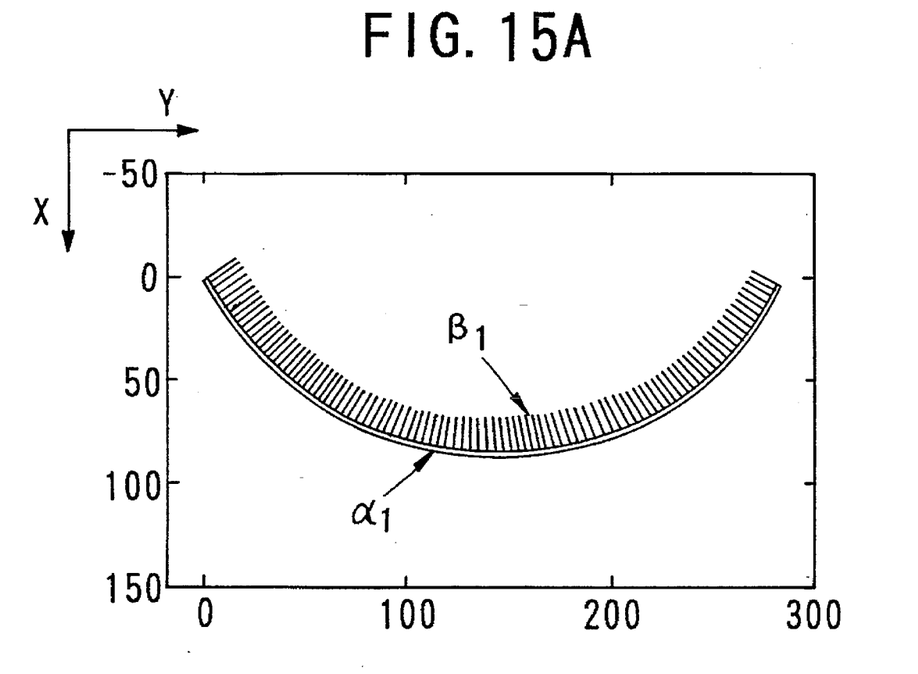
FIGS. 15A and 15B are diagrams showing the contact point/normal line and contact force during the task specifications on the fixed coordinate system according to an experimental example pertaining to the present invention.

FIG. 15A shows the experimental results in the case in which the task specifications was run object being worked on was instructed as is. The figure is a plot of the contact point/normal line and contact force calculated during the task specifications over 160 msec intervals on the absolute coordinate system, and the amount of contact force is represented by the length of the contact normal line. According to the figure, it can be confirmed that the repetitive work is able to be independently run while maintaining a fixed velocity and fixed contact force.

Figure 15B:
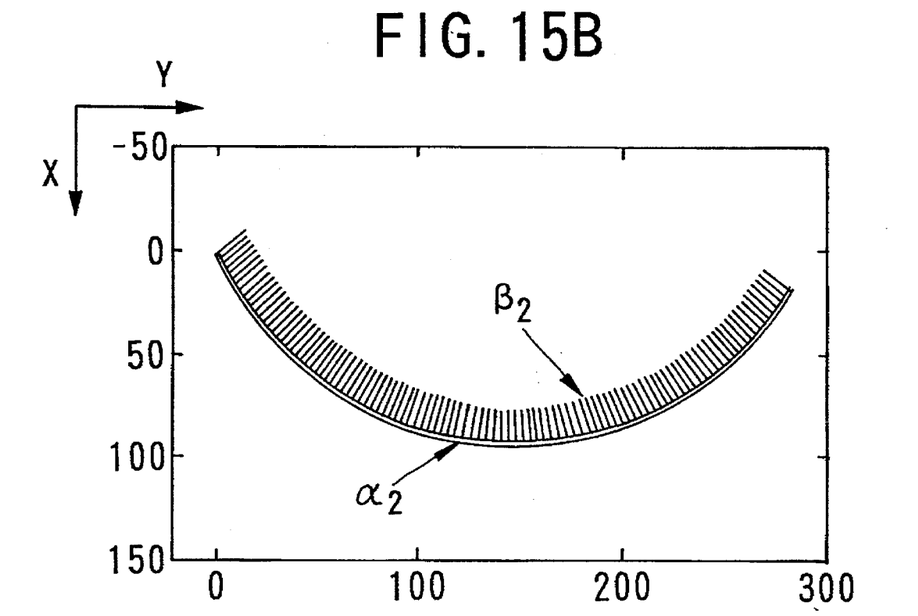
Figure 16:
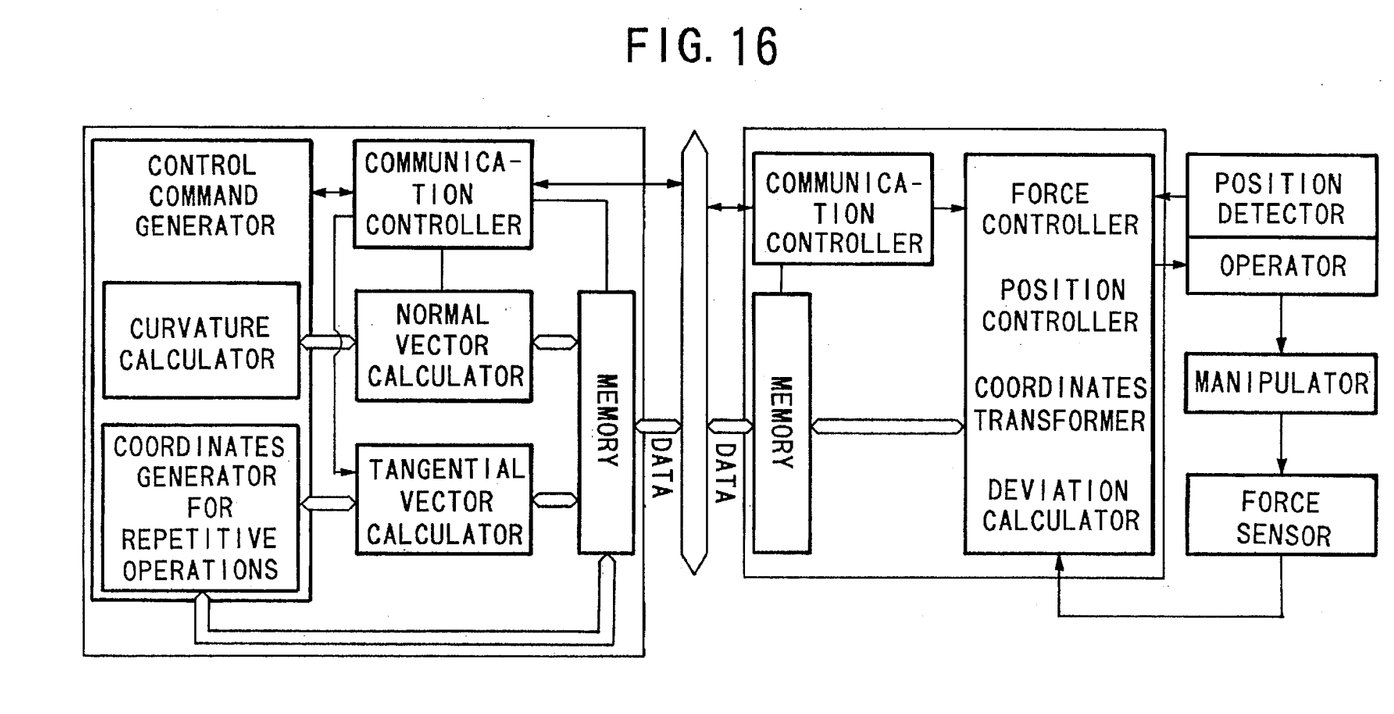
FIG. 16 is a diagram showing the composition of an example of a control device.

FIG. 15B shows the results when the object is shifted from the instructed condition by 10 mm in a horizontal direction. In this case as well, it is possible to confirm that the placement errors of the object being worked on can be absorbed due to the ability of the present invention to obtain a target path on the object in real time, and the procedure can thus be accomplished.

As demonstrated above, the present invention realizes a robotic control device having the ability, which the prior art did not, to obtain a target path on the object being worked on in real time with applications possible with errors in the force measurement device or friction, fluctuations in the friction on the contact point and changes in the contact point of the robotic arm, and changes in the work orientation.

We claim:

1. A method of determining a contact point and a normal vector at the contact point between a tool or part attached at an end of a multi-jointed robot arm and a workpiece or object fixed on a table of a robot machine, the robot being capable of detecting and recording three-dimensional position, orientation, velocity, and angular velocity of said tool or part, the normal vector being normal to a surface of said tool or part at said contact point, the method comprising the steps of:

storing data related to geometrical configuration of said tool or part in a computer memory;

recording an opposing force applied to said tool or part, said opposing force being detected by a force detector on said robot arm;

inputting into the computer memory information related to three-dimensional positions and angular velocities of said tool or part and of joints on said robot arm, and information related to said recorded opposing force applied to said tool or part;

calculating a force application vector based on said opposing force;

calculating an intersection point of said force application vector with said tool or part surface from said geometrical configuration of said tool or part;

selecting multiple points on the surface of said tool or part in an area around said intersection point, calculating a normal vector at each of said multiple points normal to the surface of said tool or part, calculating a translation velocity vector for each of said multiple points from said angular velocities of said joints, and calculating a dot product of said normal vector and said translation velocity vector for each of said multiple points;

calculating for each of said multiple points a boundary distance, said boundary distance being a product of said normal vector and a distance from each of said multiple points to a point representing a boundary area;

calculating a distance of said force application vector, said distance of said force application vector being the distance between each of said multiple points and said intersection point;

calculating a determination function for each of said multiple points from said dot products, said boundary distance, and said distance of said force application vector;

calculating said contact point among said multiple points and determining the normal line at said point of contact between said tool or part and said workpiece, said contact point being calculated by choosing a point where said determination function and the corresponding normal vector at said contact point normal to said tool or part surface are minimized; and outputting contact point and normal line information to a controller controlling the movement of said robot arm, such that said robot arm can position said tool or part.

2. A method of determining a contact point and a normal vector at said contact point as claimed in claim 1, wherein said determination function is a weighted linear sum of the dot products of said normal vector and said translation velocity vector, said boundary distance, and said distance of said force application vector.

3. A method of determining a contact point and a normal vector at said contact point as claimed in claim 1, wherein the determination function, H, is calculated by using dot products of said normal vector normal to said tool or part surface and the translation velocity I(pi), the distance of the force application vector Df(pi), and the boundary distance Dp(pi), where $$H = \gamma I(pi) + \delta Df(pi) + \xi Dp(pi)$$

wherein $\gamma$, $\delta$, and $\xi$ are weighing coefficients;

$I(pi) = Vi \cdot nw(Pi)$;

Vi: said translation velocity vector as seen from an absolute coordinate system for chosen point $I(1-n \times m)$;

nw(pi): said normal vector at the chosen point i on the absolute coordinate system;

$Df(pi) = |po-pi|$ pi: a three-dimensional position vector of a chosen point 1 on a fixed fingertip coordinate system;

$Dp(pi) = |nq \cdot (pi-q)|$;

q: a point on the flat surface as seen from the fixed fingertip coordinate system; and nq: the normal vector normal to said tool or part surface corresponding to point q.

4. A robot arm control apparatus comprising: a robot arm having multiple joints and an attached tool or part;

a set of sensors attached to said tool or part and to each of said joints of said robot arm for sensing three-dimensional position and angular velocities of said tool or part and each of said joints;

a force detector disposed on said robot arm for detecting a force applied to said tool or part;

data storage means for storing pre-input information related to geometrical shape and surface configuration of said tool or part and measured data related to three-dimensional position, orientation, and angular velocity of said tool or part, three-dimensional position and angular velocity of each of said joints, and said force applied to said tool or part;

means for storing task specifications;

calculation means for calculating a point of contact of said tool or part and a normal line at said contact point, said calculation means determining dot product of a normal vector and translation velocity, and boundary distances and force effect distances of provisional points based on said three-dimensional position of said tool or part or said position or angle of each of said joints of said robot arm, said application force, and said stored information related to the three-dimensional position of said tool or part or the three-dimensional position of each of said joints of said robot arm;

path calculation means for calculating a target path for further work based on said contact point and said normal line at the contact point; and target value calculation means for calculating robot control target values for controlling positions of said tool or part and each of said joints of said robot arm, and for controlling the force to be applied to said tool or part.

5. A robot control apparatus as claimed in claim 4, wherein said robot control apparatus is installed on a robot assembly machine for mounting a part to an object fixed on a robot machine table, said part being supported it an end of said robot arm.

* * * * *